July 10, 1951

C. E. BANNISTER 2,559,842

SHAFT-OSCILLATING FLUID-ACTUATED MOTOR HAVING
SPRING-AND-LATCH VALVE-REVERSING MEANS

Filed Jan. 13, 1948

CLYDE E. BANNISTER
INVENTOR

BY Willard D. Eakin

ATTORNEY

July 10, 1951

C. E. BANNISTER 2,559,842

SHAFT-OSCILLATING FLUID-ACTUATED MOTOR HAVING
SPRING-AND-LATCH VALVE-REVERSING MEANS

Filed Jan. 13, 1948

CLYDE E. BANNISTER
INVENTOR

BY Willard D. Eakin

ATTORNEY

Patented July 10, 1951

2,559,842

UNITED STATES PATENT OFFICE 2,559,842

SHAFT-OSCILLATING FLUID-ACTUATED MOTOR HAVING SPRING-AND-LATCH VALVE-REVERSING MEANS

Clyde E. Bannister, Houston, Tex.

Application January 13, 1948, Serial No. 2,000

7 Claims. (Cl. 121—9)

This invention relates to a motor assembly inclusive of or adapted for driving a device such as a mower or trimmer for lawns or hedges.

Its chief objects are to provide a device of this character adapted to be actuated as to the cutting operation by power usually available at the site of a lawn or a hedge; to provide for watering of the lawn or hedge as an incident of the mowing or trimming operation; to provide a device of light and inexpensive construction; and to provide an improved motor of the fluid-actuated shaft-oscillating type, and especially one having high power and low amplitude of oscillation and freedom from the defect of stopping on dead center.

Figure 1:
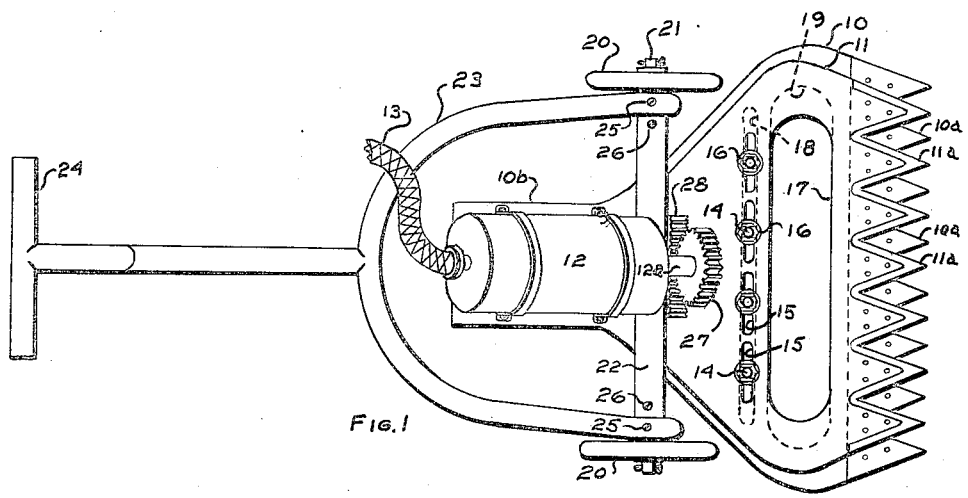
Fig. 1 is a view from above of an assembly embodying my invention in its preferred form.
Figure 2:
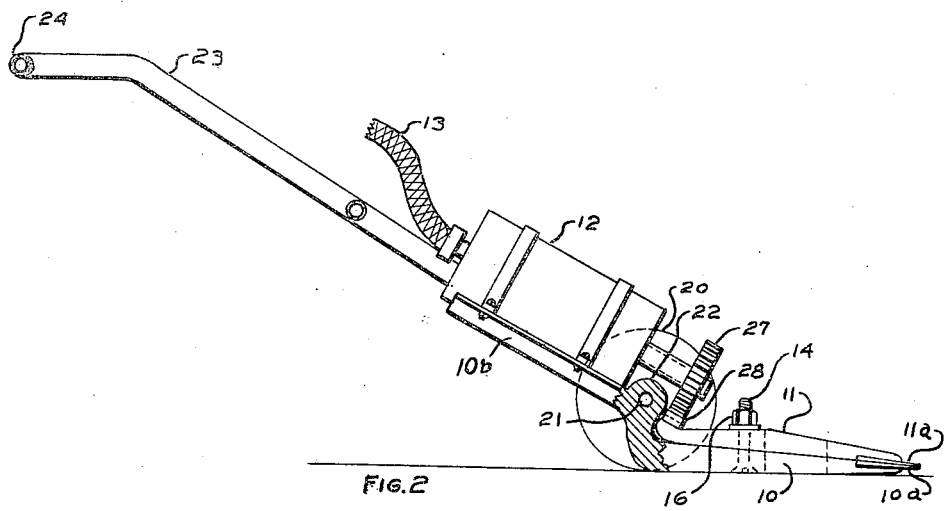
Fig. 2 is a side elevation of the same with parts sectioned and broken away.
Figure 3:
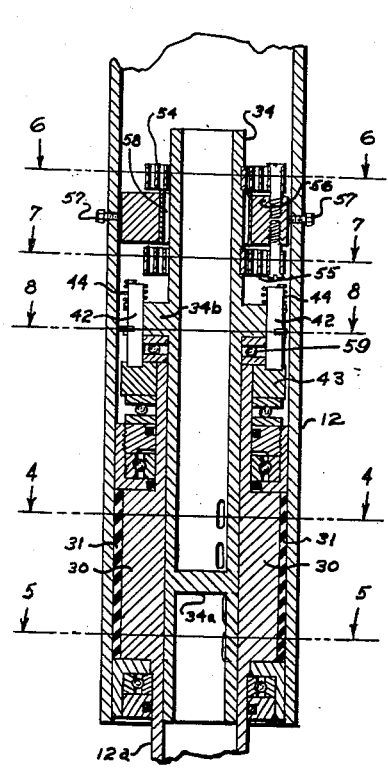
Fig. 3 is a longitudinal, middle section of the motor.

The device comprises a lower, preferably aluminum, casting 10 adapted, when the device is used as a lawn mower, to be slid upon, or to be moved along in close proximity to, the surface of the ground, and an upper, preferably aluminum, casting 11 mounted to slide back and forth transversely of the assembly upon the lower casting 10.

Each of these castings is of serrated form along its front edge and has riveted to it a set of triangular cutters, 10a, 10a or 11a, 11a, of relatively hard metal, the two sets of knives being adapted to coact in the manner of a mowing machine or hair clippers, to cut the grass or to trim the twigs of the hedge.

The upper casting is reciprocated by a motor 12 of the fluid-actuated, shaft-oscillating type, mounted upon a rearward extension 10b of the casting 10 and provided with actuating fluid by a garden hose 13 extending to it from a lawn faucet (not shown). The motor's shaft, 12a, is hollow and is the outlet for spent motive fluid from the motor.

To hold down the upper casting upon the lower casting while permitting it to have the necessary relative reciprocating movement a set of bolts 14, 14 have their heads countersunk in the lower face of the casting 10 and extend upward through it and through respective transverse, aligned slots 15, 15 in the upper casting, and each bolt, on the upper face of the upper casting, is provided with a wide-based hold-down nut 16 having suitable means such as a cotter pin (not shown) for holding it against rotation on the bolt.

For lightness, and to permit cut grass to fall through them, the two castings preferably are given skeletonized form, as by forming the upper casting with a long grass-discharging and water-discharging slot 17 just back of the cutters, in addition to the slots 15 above mentioned, and forming the lower casting with slots 18, 18 registerable with parts of the slots 15, and forming it with a long slot 19 under the slot 17.

The device can be pushed along on the lawn in the manner of a sled, or can be held above the ground by hand, in any necessary altitude, for trimming a hedge or an inclined or vertical edge of a lawn. Thus it is not essential that it be provided with wheels, but the embodiment here shown includes wheels 20, 20 mounted on the ends of an axle 21 which extends through a hub-like flange 22 formed on the casting 10.

Mounted upon the axle 21 between each wheel and the hub flange of the casting 10 is one of the fork arms of a Y-shaped handle structure 23, the stem of which extends rearwardly and preferably is provided with a cross-bar 24 at its rear end, as the propelling handle of the assembly.

The handle structure and the cutter assembly can be, if desired, adjustably secured in fixed angular relation to each other, as by providing the hub portions of the handle structure with set screws 25, 25 acting against the axle, and the hub portion of the casting 10 with set screws 26, 26 acting against the axle, so that the height at which the grass is cut can be controlled by keeping the handle at an appropriate height, and so that adjustment can be made for persons of different heights.

Alternatively, with or without the wheels, and with or without fixed angular relation of the handle and the castings, the device can be slid over the lawn like a sled while being actuated, as to the cutting operation, by the motor.

For simplicity and economy of construction, the drive connection from the motor's shaft 12a to the casting 11 preferably consists, as here shown, of a pinion gear 27 secured upon the shaft and meshed with a rack 28 secured upon the upper face of the casting 11.

In order to have the center of gravity of the cutter-and-motor assembly ahead of the axle when the set screws 25 or 26 are freed from the axle, it is desirable that the motor be light and of short length, with suitable diameter to give adequate power, and that it be set well forward of the assembly, so that the structure ahead of the axle will not have to be heavy in order to be held against the ground by its preponderant weight.

It is desirable, but not indispensible, that, as shown, the motor be mounted upon the cutter assembly, without direct connection of the motor to the handle structure, so that the rack 28 and pinion 27 can continue to have the same angular relation to each other when the angular relation of the handle structure and cutter assembly is changed.

The construction as described is such that the exhaust water from the motor pours from the hollow motor shaft 12a onto the cutter assembly and serves to wash the cut grass from it.

Preferably but not necessarily the motor 12 has the construction and mode of operation that are illustrated in Figs. 3 to 9.

Figures 4, 5:
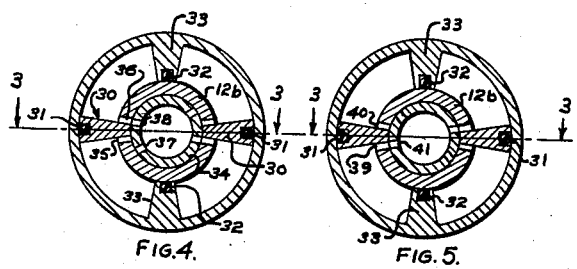
Fig. 4 is a section on line 4—4 of Fig. 3.
Fig. 5 is a section on line 5—5 of Fig. 3.
Figures 6, 7:
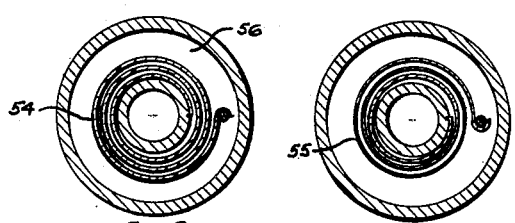
Fig. 6 is a section on line 6—6 of Fig. 3.
Fig. 7 is a section on line 7—7 of Fig. 3.

Inside of the casing 12, the oscillatory shaft 12a, has formed integrally with it a pair of diametrically opposite impeller vanes 30, 30 extending radially from an impeller-hub portion 12b of the shaft, Figs. 4 and 5. Directly below and above the impeller vanes the shaft has suitable radial and thrust bearings, closure members and fluid seals interposed between it and the casing or shell 12, and rubber sealing strips 31, 31 are mounted in respective grooves formed in the outer edge faces of the vanes, for sealing them to the inner face of the casing while permitting them to oscillate the shaft.

Similarly sealing rings 32, 32 for sealing against the impeller hub 12b are mounted in grooves in the radially inner edge faces of fluid-abutments 33, 33 which with the vanes 30 define two pairs of variable-capacity chambers for causing each vane to act as an oscillating piston under the force of pressure fluid conducted into and vented from the chambers in suitably timed relation.

The timed valve mechanism for so controlling the fluid comprises a tubular valve 34 rotatively fitting in the hub portion 12b of the impeller member and projecting upward therefrom, with an open upper end, for receiving motive fluid from the interior of the casing and conducting it to the pressure sides of the vanes, through ports in the hub.

About midway of the length of the vanes the valve 34 is formed with a transverse partition 34a separating its upper, pressure-fluid chamber from its lower chamber, which is a venting passage and is downwardly open for discharging spent fluid through the oscillatory motor shaft 12a.

The intake port arrangement is shown in Fig. 4 and the outlet port arrangement is shown in Fig. 5.

Each port, as the word is hereinafter used, consists of a plurality of aligned slots, the bridging elements between the slots providing strength of structure.

As the two sets of inlet ports are alike, it will be necessary only to describe the set shown in the left half of Fig. 4. This set comprises two ports 35, 36 in the wall of the impeller hub 12b, on opposite sides of and close to the base of the vane 30, and two ports 37, 38 in the wall of the valve tube 34, spaced farther apart than are the ports 35, 36.

The two sets of outlet ports, Fig. 5, also are alike, and a description of the set shown in the left half of Fig. 5 will be sufficient.

This set comprises two ports 39, 40 in the wall of the impeller hub 12b, on opposite sides of and close to the base of the vane 30, and a single port 41 in the wall of the tubular valve 34.

These port arrangements are such that with the relatively rotatable hub 12b and valve 34 in the positions shown in Figs. 4 and 5, the inlet port 38 being registered with the inlet port 36 and the outlet port 41 being registered with the outlet port 39, the impeller will be driven counter-clockwise until the valves are reversed by a relatively clockwise movement of the valve 34 with respect to the hub.

To compel the two to rotate together until the time for valve reversal, and then release them for a spring-drive, valve-reversing, relative movement, a pair of cam-released latching devices are provided.

Each of these devices comprises an axially disposed latching bolt 42 slidably mounted in a hole formed in an external flange 34b projecting from the valve 34. Each bolt is constantly urged in the direction of a collar 43 secured upon the adjacent end of the impeller hub, by respective helical hold-down springs 44, 44 each anchored at its lower end to the flange 34b, having its middle part surrounding the bolt, and having its upper end engaging over the upper end of the bolt.

The collar 43 (Figs. 8 and 9), at the position of each of the latching devices, is formed in its upper face with an arcuate slot 45 of determinate length and in each end of the floor of this slot is a bolt-retaining hole, 46 or 47, of greater depth than the middle part of the slot.

Projecting laterally from each bolt 42, through a slot 48 in the wall of the flange 34b, is a lifting pin 49 adapted to coact with oblique cam faces such as the faces 50, 51 formed on the upper end of each of a pair of diametrically opposite cams 52, 53 which are secured to the inner face of the motor casing 12 as by rivets 52a, 52a.

Figure 8:
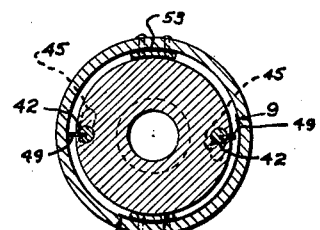
Fig. 8 is a section on line 8—8 of Fig. 3.
Figure 9:
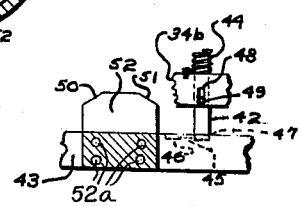
Fig. 9 is a section on line 9—9 of Fig. 8.

Fig. 9 shows the parts as they are at an earlier stage of the half-cycle than the stage that is shown in Figs. 4, 5 and 8, but shows the bolt engaged in the right-hand retaining hole, for rightward movement of the latched-together impeller and valve.

For providing the spring-drive relative movement of the impeller and valve above referred to, for quickly reversing the valves at the end of each approximately 180° half-cycle, two opposed volute torsion springs 54, 55 connect the valve 34 with a spring-anchoring annular member 56 which is held centered in the casing by set-screws 57, 57 and has a radial bearing 58 interposed between it and the valve. The valve is held against the force of the motive fluid by a thrust bearing 59 between the flange 34b of the valve and the collar 43 on the impeller hub, and the valve is held against the latch-lifting force of the cams 52, 53 by the differential of fluid-pressure on the two faces of the valve's partition 34a.

In the operation of the motor, the parts being at the stage of the half-cycle represented by Figs. 3 to 8, water passes from the upper part of the casing's interior, through the valve's upper bore, and through the ports 38 and 36, Fig. 4, and the corresponding ports at the right of Fig. 4, and drive the impeller counter-clockwise, and with it the valve, each latching bolt 42 being seated in the leading hole, 47, Fig. 9, in the floor of the recess 45.

Such counter-clockwise movement of the valve stresses the spring 55, and permissibly also the spring 54, and thus builds up a reverse, clockwise force of the spring or springs against the valve.

When, at the end of the half-cycle, the bolt 42 shown in Fig. 9 is lifted from the hole 47, but not out of the recess 45, by the cam 53, Fig. 8, and the other bolt 42 is likewise lifted by the cam 52, while the impeller is still being driven counter-clockwise, the springs quickly rotate the valve clockwise with relation to the impeller so far as the short length of the recess 45 permits, thus reversing the valves, the inlet ports 37 becoming registered with the ports 35 and the outlet ports 41 becoming registered with the ports 40.

As each latching bolt is stopped by the end-wall of the recess 45 it enters the hole 46 under the force of the hold-down spring 44 and thus the valve and impeller are latched together for the clockwise half-cycle, which in turn is terminated, and the valves reversed, in the manner just described as to the counter-clockwise half-cycle, and the oscillatory driving of the shaft 12a is thus continued.

As the valves are reversed while the impeller is still being driven, the stopping of the impeller is cushioned by the appreciably gradual, although quick, reversal of the water pressures on the two sides of each vane and it is not necessary that the vanes contact the fluid-abutments 33 in being reversed.

Also, because the valves are reversed quickly, by the snap action of the springs, while the impeller is still being driven, there is no danger of the motor stopping on "dead-center," so to speak, the stored energy in the springs being great enough to assure completion of the valve-reversing movement of the valve in relation to the impeller, and the impeller being compelled to lag in the reverse movement by the fluid pressure and by its forward momentum and its inertia against acceleration in the opposite direction.

Modifications are possible without departure from the scope of the invention as defined in the appended claims.

I claim:

1. A motor comprising a casing structure, an impeller structure of the oscillatory type which with the casing structure defines a pair of variable-volume chambers, the impeller structure being formed with inlet and outlet ports, a valve structure formed with ports for cyclic coaction with those of the impeller structure, spring means for resisting movement of the valve structure with the impeller structure, latching means for compelling the two to move together substantially throughout a half-cycle and thus store energy in the spring means, and contact means for releasing the latching means approximately at the end of the half-cycle and thus causing the stored energy of the spring means to reverse the valves by effecting reverse movement of the valve structure in relation to the impeller structure.

2. A motor comprising a fluid-impelled member, valve means for reversing the drive of said member, a valve-controlling member, latching means for compelling the valve-controlling member to move with the fluid-impelled member, spring means put under stress by such movement of the valve-controlling member, and contact means made effective by such movement for releasing the latching means and thus permitting the spring means to effect reverse movement of the valve-controlling member.

3. A motor comprising a fluid-impelled member, valve means for reversing the drive of said member, a valve-controlling member, latching means for compelling the valve-controlling member to move with the fluid-impelled member, spring means put under stress by such movement of the valve-controlling member, and contact means made effective by such movement for releasing the latching means and thus permitting the spring means to effect reverse movement of the valve-controlling member, the fluid-impelled member and the valve-controlling member having lost-motion relationship to each other, the spring means having two-way action, and the latching means and the contact means being constructed and arranged to function alternately at the two limits of the lost motion.

4. A motor comprising an oscillatory, fluid-actuated impeller having a hollow hub formed with valve ports, a valve rotatably mounted in said hub and having ports for cyclic coaction with those of the hub, latching means interposed between the two for compelling them to rotate together, spring means stressed in each half-cycle by the movement of the impeller, and make-and-break contact means for releasing the latching means approximately at the end of each half-cycle, the spring means being so associated with the other parts that upon being so released it effects relative movement of the valve and hub and thus reverses the setting of the valve ports.

5. A motor comprising an oscillatory, fluid-actuated impeller having a hollow hub formed with valve ports, a valve rotatably mounted in said hub and having ports for cyclic coaction with those of the hub, latching means interposed between the two for compelling them to rotate together, spring means surrounding the impeller's axis of oscillation and adapted to be stressed in each half-cycle by the movement of the impeller, and make-and-break contact means for releasing the latching means approximately at the end of each half-cycle, the spring means being so associated with the other parts that upon being so released it effects relative movement of the valve and hub and thus reverses the setting of the valve ports.

6. A motor comprising two relatively rotatable tubular members formed with valve ports for cyclic coaction, latching means interposed between the two for compelling them to rotate together, spring means put under stress by such rotation in either direction, and contact means made effective by such rotation for releasing the latching means approximately at the end of each half-cycle, the spring means being so associated with the other parts as to initiate reverse movement of one of the tubular members with relation to the other upon the releasing of the latching means.

7. A motor as defined in claim 6 in which the latching means comprises a latching bolt slidably mounted in relation to one of the tubular members, means on the other tubular member formed with a lost-motion slot constantly occupied by an end portion of the bolt, the floor of said slot being formed with a socket at each of its ends for alternate interlocking reception of said end portion of the bolt, and yielding means for constantly urging the bolt in the direction for such interlocking reception.

CLYDE E. BANNISTER.

REFERENCES CITED

The following references are of record in the file of this patent:

UNITED STATES PATENTS

| Number | Name | Date |
| --- | --- | --- |
| 299,034 | Stone | May 20, 1884 |
| 399,763 | Martin | Mar. 19, 1889 |
| 967,560 | Rizer | Aug. 16, 1910 |
| 1,037,865 | Chambers | Sept. 10, 1912 |
| 1,814,649 | Wade | July 14, 1931 |
| 2,316,356 | Nette | Apr. 13, 1943 |
| 2,322,610 | Wilcox | June 22, 1943 |